US011806758B2

(12) United States Patent
Ashworth

(10) Patent No.: US 11,806,758 B2
(45) Date of Patent: Nov. 7, 2023

(54) METHOD FOR PROCESSING A BATCH OF MAILPIECES BY READING BARCODES PRINTED THEREON

(71) Applicant: QUADIENT TECHNOLOGIES FRANCE, Bagneux (FR)

(72) Inventor: Peter Ashworth, London (GB)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 336 days.

(21) Appl. No.: 17/130,741

(22) Filed: Dec. 22, 2020

(65) Prior Publication Data
US 2021/0187555 A1 Jun. 24, 2021

(30) Foreign Application Priority Data
Dec. 23, 2019 (EP) .................................... 19306762

(51) Int. Cl.
*B07C 3/14* (2006.01)
*G06K 7/10* (2006.01)
(Continued)

(52) U.S. Cl.
CPC .................. *B07C 3/14* (2013.01); *B07C 3/18* (2013.01); *G06K 7/10861* (2013.01);
(Continued)

(58) Field of Classification Search
CPC ................ B07C 3/10; B07C 3/14; B07C 3/18
(Continued)

(56) References Cited

U.S. PATENT DOCUMENTS 5,933,829 A * 8/1999 Durst .................. G06F 16/9554
6,557,755 B1 * 5/2003 Pickering, Jr. ... G07B 17/00661
235/376
(Continued)

FOREIGN PATENT DOCUMENTS

EP 2166512 A1 * 3/2010 ....... G07B 17/00467
EP 2166512 A1 3/2010
(Continued)

OTHER PUBLICATIONS

European Search Report for European Patent Application No. 19 30 6762, completed Jun. 15, 2020, 2 pages.

*Primary Examiner* — Terrell H Matthews
(74) *Attorney, Agent, or Firm* — Cozen O'Connor

(57) ABSTRACT

A method for processing a batch of mailpieces on an inserting station comprising at least a document feeder and a document scanner to read barcodes printed on pages of documents belonging to said batch of mailpieces, the method including the steps of selecting a job type having job parameters for the batch of mailpieces, extracting a first page belonging to a mailpiece from the document feeder, scanning the first page with the document scanner, searching a first barcode printed on the first page, reading the first barcode on the first page, extracting from the first barcode an information including at least one of a mailpiece identifier, a page count or position coordinates, processing the information to retrieve a position of a second barcode printed on a second page to be extracted from the document feeder, extracting the second page from the document feeder, scanning the second page with the document scanner, searching a second barcode on the second page at the retrieved position, and reading the second barcode on the second page.

13 Claims, 6 Drawing Sheets

(51) Int. Cl.
   *G06T 7/70*    (2017.01)
   *B07C 3/18*    (2006.01)
   *G06K 7/14*    (2006.01)
   *G06K 19/06*   (2006.01)
   *G06Q 10/10*   (2023.01)
   *G06V 30/414*  (2022.01)

(52) U.S. Cl.
   CPC ......... *G06K 7/1413* (2013.01); *G06K 7/1456* (2013.01); *G06K 19/06028* (2013.01); *G06Q 10/10* (2013.01); *G06T 7/70* (2017.01); *G06V 30/414* (2022.01); *G06K 2007/10504* (2013.01)

(58) Field of Classification Search
   USPC .................................................. 209/583, 584
   See application file for complete search history.

(56) References Cited

U.S. PATENT DOCUMENTS

| | | | |
|---|---|---|---|
| 7,451,014 B2 * | 11/2008 | Welch .............. | G07B 17/00467 |
| | | | 700/223 |
| 8,306,259 B2 * | 11/2012 | Wiersma ................... | B07C 3/14 |
| | | | 382/101 |
| 2007/0176356 A1 * | 8/2007 | Welch .................... | G06Q 40/02 |
| | | | 271/185 |
| 2010/0315692 A1 * | 12/2010 | Spitzig ............ | G07B 17/00459 |
| | | | 358/498 |

FOREIGN PATENT DOCUMENTS

| | | | | |
|---|---|---|---|---|
| EP | 3276560 A1 * | 1/2018 | ........... | G05B 19/124 |
| EP | 3276560 A1 | 1/2018 | | |

* cited by examiner

METHOD FOR PROCESSING A BATCH OF MAILPIECES BY READING BARCODES PRINTED THEREON

TECHNICAL FIELD

The present invention relates to mail processing and customer communication, and notably to improvements in mail production systems incorporating notably paper handling machines used for inserting documents and inserts into envelopes.

BACKGROUND

Despite a noticeable decrease in printed correspondence since the advent of Internet, physical mail remains a preferred and efficient communication channel for many customer segments. Letters have undoubtedly more substance than emails and a higher propensity to capture and retain customer attention. Modern output management technology allows the generation of highly personalized documents, and a printed communication can typically include a variety of barcodes, which are used either in the manufacturing or the distribution process. For instance control codes and/or mailpiece identifiers are commonly printed as barcodes. Barcodes comprising hyperlinks to the internet can also be added.

Inserters can indeed be operated in various modes. In the simplest one, the job parameters are fixed and the same tasks are performed on all mailpieces. In a more elaborated mode, corresponding to an open loop production system, each mailpiece bears control codes that are read and interpreted by the inserter (e.g. for adding more pages or inserts). In the most sophisticated (data driven) mode, corresponding to a close loop production system, the mailpiece bears a unique identifier that points to a database where the finishing instructions for that particular mailpiece are recorded.

In a close loop production system, the production software generates a job file that contains finishing instructions about each mailpiece that are printed. As mailpieces enter a processing equipment such as a folder/inserter, their identifiers are scanned, finishing instructions are looked-up in the job file and executed. Finishing instructions are typically related to page count, inserts to be added into envelopes, and addresses or messages to be printed thereon, thus avoiding the use of window envelopes.

Adversely, in the open loop production system, the production software prints a batch of mailpieces but does not generate a file containing finishing instructions. The finishing instructions are rather included in a barcode which is printed on the mailpiece and can be interpreted directly by the machine. Although they do not require real-time communication and are thus simpler to implement, open loop systems offer much less possibilities in mailpiece customization and have the inherent disadvantages of not providing integrity.

U.S. Pat. No. 7,451,014 describes a mailpiece inserter system including a User PC or computer, a mailpiece inserter and a client server which are network connected to share information and data concerning mail run data. The communication network may be disabled in an open loop control mode to facilitate rapid mailpiece processing and enabled in a closed loop control mode to facilitate tracking, reconciliation and security of mailpiece assembly. The mailpiece inserter includes an inserter control system operative to read and interpret assembly code information directly from the mailpiece content material in the open loop control mode.

The dual mode inserter system of U.S. Pat. No. 7,451,014 requires both a mailpiece identifier and an assembly code to be printed on each mailpiece. Other references may also be printed on the mailpiece, either in clear or in barcode format. The appearance of the document may be greatly altered by the presence of multiple barcodes which are not aimed to customers.

Other barcodes can also be added to printed documents or mailpieces, like for instance to help bank and post office counter clerks process bill payments. These barcodes take space away from the message the sender is trying to communicate to the recipient. Using multiple barcodes on a mailpiece creates a variety of problems. For example, using different barcode symbologies requires different readers. Reading errors can occur if similar encoding is used in barcodes that are physically close to each other on the printed page. Hardware and/or software readers can become confused, potentially using the wrong barcode or causing the machine to stop. It is therefore important to precisely locate the specific barcode that is associated with a given step of mailpiece processing.

U.S. Pat. No. 8,306,259 describes a method for processing a document, the method including defining a first possible location of a marking on a document; and searching a first part of a document for the marking, the first part corresponding to the first possible location. When the marking is not found in the first part a further part of the document is searched. The location of the marking is stored in the memory in case the marking is found in the first part or the further part, information about the document is derived from the marking. The derived information can be used for performing one or more processing steps with the document, such as printing, franking, assembling mail pieces, or opening received mail pieces.

When using the method of U.S. Pat. No. 8,306,259, the entire document may be searched in an initial step. If a marking is found, successive documents will be searched first in the location corresponding to this marking, then in other locations corresponding to previously registered markings. During the searching phase, only data obtained from scanning the parts of the document corresponding to defined marking locations may be processed, and data obtained from other parts of the document may be disregarded. The amount of time and processing power required to find a marking is reduced significantly in this manner.

However, U.S. Pat. No. 8,306,259 does not teach how to determine which markings correspond to mailpiece processing instructions. Additionally, the search strategy based on marking locations found on a directly preceding document or corresponding to locations in which a desired marking has been found most often may not be appropriate when the machine is supplied with a completely new batch of documents. This is further complicated when the document bears multiple barcodes, amongst which mailpiece identifiers and/or finishing instructions associated with the open or close loop production system may not be easily distinguishable from others.

OBJECT AND DEFINITION OF THE INVENTION

It is therefore an object of the invention to provide a method allowing to identify markings corresponding to mailpiece identifiers and/or finishing instructions, the markings being printed on documents and the mailpiece identifiers and/or finishing instructions being required to process a batch of mailpieces containing the documents.

It is another object of the invention to provide a method allowing to reduce the amount of time and processing power required to find markings on successive documents contained in a given mailpiece, and subsequently the amount of time and processing power required to process the whole batch of mailpieces.

It is another object of the invention to provide a method allowing to avoid reading errors when searching documents printed with multiple barcodes for the purpose of processing and/or tracking mailpieces, or associated with further processing steps, or intended for customer communication.

It is another object of the invention to provide a device for using the method in either an open or close loop production system.

These objects are achieved by a method for processing a batch of mailpieces on an inserting station comprising at least a document feeder and a document scanner to read barcodes printed on pages of documents belonging to said batch of mailpieces, comprising the following steps:

selecting a job type having job parameters for the batch of mailpieces,
extracting a first page belonging to a mailpiece from the document feeder,
scanning the first page with the document scanner,
searching a first barcode printed on the first page,
reading the first barcode on the first page,
extracting from the first barcode an information including at least one of a mailpiece identifier, a page count or position coordinates,
processing the information to retrieve a position of a second barcode printed on a second page to be extracted from the document feeder,
extracting the second page from the document feeder,
scanning the second page with the document scanner,
searching a second barcode on the second page at the retrieved position, and
reading the second barcode on the second page.

Once a job type corresponding to a batch of mailpieces has been selected, the first page of a first document belonging to the first mailpiece is searched for a barcode including a mailpiece identifier according to the job parameters. An information is extracted from this controlling barcode and processed it to find the position of a second barcode printed on subsequent pages of the first document, and corresponding for instance to finishing instructions. When all pages of the first document have been extracted and the first mailpiece has been completed according to the finishing instructions, the first page of the second document belonging to a second mailpiece is extracted and searched for a barcode including a mailpiece identifier according to the job parameters and/or an information extracted from the last page of the previous document. This operation is repeated for all successive mailpieces of the batch.

The job parameters may define in which part of the first page of a document the mailpiece identifier is to be searched. For instance this part may be defined as the location of the address window. Indeed, mailpiece identifiers can be used for integrity purposes and thus shall remain visible after the mailpiece has been inserted.

Moreover, the job parameters may define which type of controlling barcode, e.g. symbology and content, is used for mailpiece identifiers. In this manner, other barcodes residing on the same part of the first page will be disregarded. This is particularly useful as the address window may also contain postal barcodes for distribution purposes.

The mailpiece identifier typically includes a job ID related to a particular batch of mailpieces, and a mailpiece ID related to a particular mailpiece in the batch. This information can easily be complemented with an indication of the position where barcodes corresponding to finishing instructions can be found on the following pages of the document.

The finishing instructions typically consist in control codes for adding more pages or inserts. The last page of a document bears a specific code, signalling to the inserting station that the following page corresponds to another document, belonging to the following mailpiece.

When the mailpieces are processed in a close loop production system, it may not be required to locate finishing instructions as these are included and can be looked-up in the job file. However, if the network communication is disabled for any reason, the processing of mailpieces can continue in an open loop mode.

BRIEF DESCRIPTION OF THE DRAWINGS

The invention will be described and explained with additional specificity and detail through the use of the accompanying drawings in which.

DETAILED DESCRIPTION OF EXEMPLARY EMBODIMENTS

Figure 1:
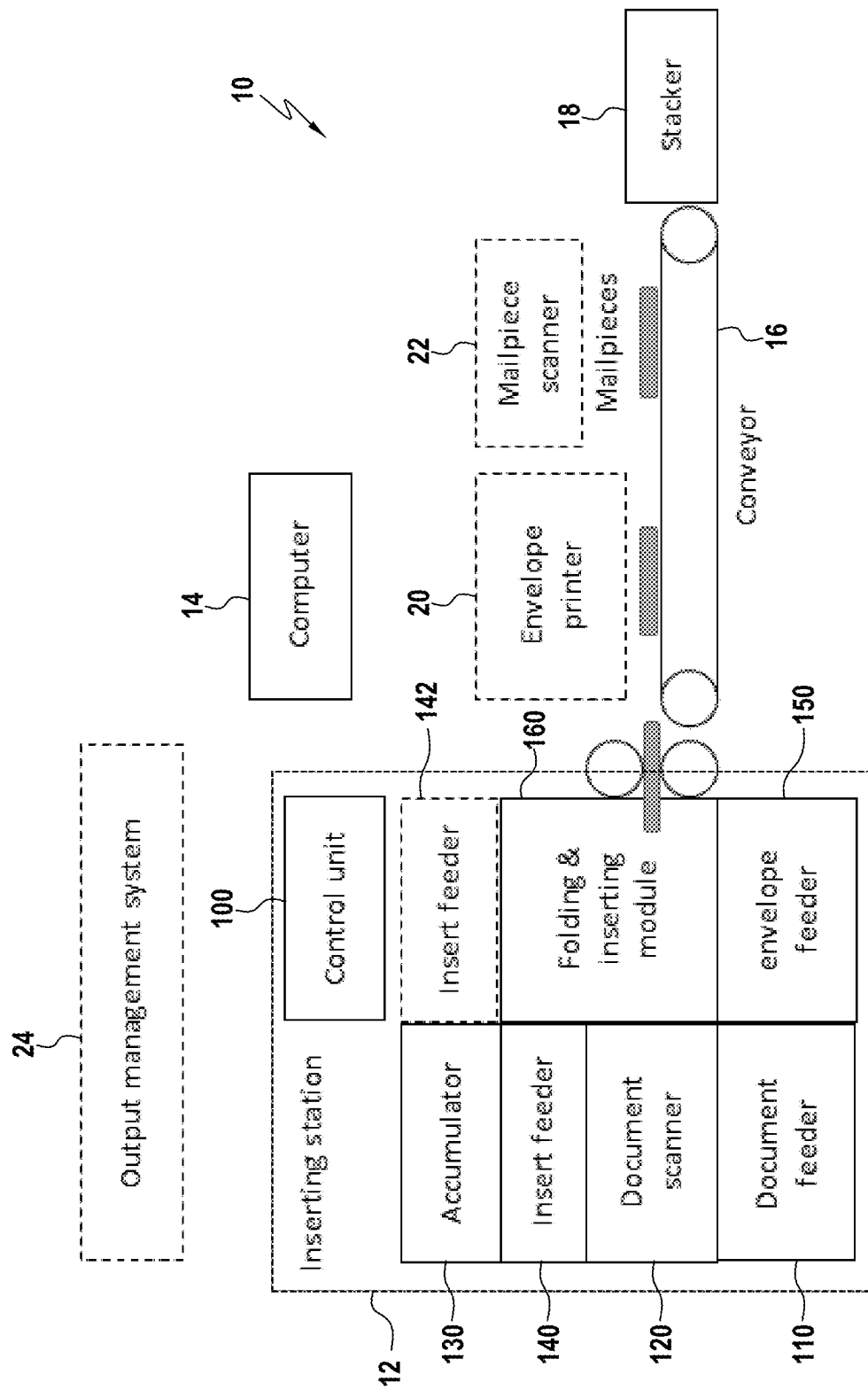
FIG. 1 is a general view of a production system showing a mailpiece production system including the inserting station of the invention and its interactions with other stations.

FIG. 1 is a general view of a production system showing a mailpiece production system 10 including the inserting station 12 of the invention and its interactions with other stations.

The system comprises a general purpose computer 14 for running a production software and controlling several processing stations. The processing stations typically include the inserting station 12, a conveyor 16 and a stacker 18. The stations may also include an optional envelope printer 20 and an optional mailpiece scanner 22. The inserting station typically comprises a control unit 100, a document feeder 110, a document scanner 120, a document accumulator 130, one or more insert feeders 140, 142, an envelope feeder 150, and a folding/inserting module 160.

The computer 14 may be in relation with an external output management system 24, from which the job file may be imported. The job file may also be generated directly by a production software running on the computer 14, and job reports and statistics generated by the computer sent to the output management system 24 for consolidation with other data. It shall be noted that the output management system 24 does not generate the processing instructions, which are rather defined by the production software according to the selected job type.

In operation, pages of documents are extracted from the document feeder 120 and directed to the document scanner 110. Mailpiece identifiers or finishing instructions are searched on the pages and processed by the control unit 100. If the production system is in the close loop mode, then the finishing instructions corresponding to the mailpiece are looked-up in a job file residing in the database of the computer 14. Adversely, if the production system is in the open loop mode, then the mailpiece identifiers is recorded and finishing instructions are executed directly by the control unit 100.

According to the finishing instructions, other pages belonging to the same document may be extracted from the document feeder 120, scanned by the document scanner 110 and accumulated in the accumulator 130, one or more inserts may be extracted from the one or more insert feeders 140, 142 and added to the document set. The complete document set is then directed to the folding/inserting module 160, folded and inserted into an envelope which has been extracted from the envelope feeder 150. Thick inserts such as booklets may also bypass the folding operation and be added to the folded document set. When the document sets has been inserted to form mailpieces, the mailpieces exit from the folding/inserting module 160 and are conveyed to the following stations.

The envelopes are preferably window envelopes allowing the mailpiece identifier to be scanned after the document set has been inserted. Alternatively envelopes may be plain windowless envelopes on which the recipient address coming from the job file will be printed by the optional envelope printer. The mailpiece may also be scanned by the optional mailpiece scanner 22 before being stacked in the stacker 18. This second scanning operation is usually not required for integrity purposes, as this is rather ensured by the monitoring and recording of the perfect execution of finishing instructions. However, it might be required to register images of the mailpieces to prove, for instance, that a particular mailpiece has been sent. Image analysis may also be performed to detect print defects.

Figure 2:
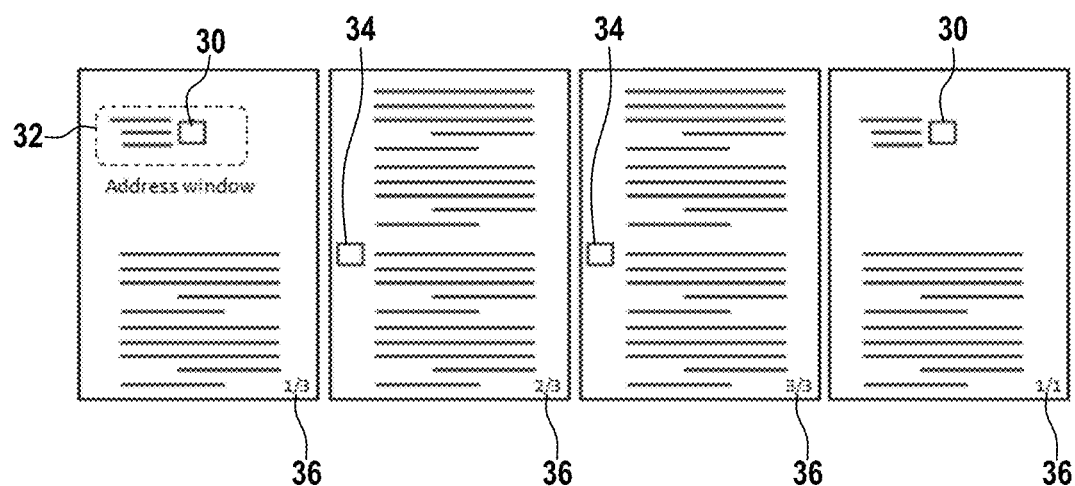
FIG. 2 shows an example of a document set to be processed according to the invention.

FIG. 2 shows an example of a document set to be processed according to the invention.

The mailpiece identifier of the document is printed on the first page, referred 1/3, usually as a barcode 30. This mailpiece identifier is preferably located in the envelope window 32, or address window, and will be searched at a particular position, according to the job parameters of the selected job type. Other barcodes, such as postal barcodes used for mailpiece tracking and distribution, may also be included in the address window but differ significantly from the mailpiece identifier in symbology and content. However in some cases, a postal barcode unique to the mailpiece may also be used as the mailpiece identifier.

The mailpiece identifier barcode 30 also contains an indication of the position where barcodes corresponding to finishing instructions can be found on the following pages of the document, referred 2/3 and 3/3. These barcodes 34 are preferably located in the page sides or margins (here on the left one) but may also be at the top or bottom, to reduce visual impact and allow maximum place for customer communication.

It shall be noted that in many jobs, the finishing instructions are the same for all mailpieces of the batch. In this case they are part of the job parameters and do not need to be printed on each page. On the other hand, it is often useful to reprint the mailpiece identifier on each page of a document to ensure by scanning that all pages have been extracted. The barcodes preferably includes a page count 36 of the type N/M for that purpose.

In the case illustrated here, the barcode 34 of the third page indicates that it is the last one of the document, and that the next page to be extracted is the first page of the following document, referred 1/1, belonging to another mailpiece. The mailpiece identifier barcode 30 of the next page will be searched at the particular position within the address window, according to the job parameters of the selected job type. In this case, the following document contains only one page and no other position will be included in the barcode 30 but rather, if required, the finishing instructions for to that particular mailpiece.

As mentioned above, the finishing instructions usually relate to inserts (not represented) to be selectively added to the document. The related barcode may also include a reprint of the mailpiece identifier and a page count for integrity purposes. Barcodes corresponding to mailpiece identifier and finishing instructions may carry essentially the same information but printed in different symbologies, and at different positions on the first and subsequent pages of a document. In the following, they will be referred commonly as controlling barcodes.

Figure 3:
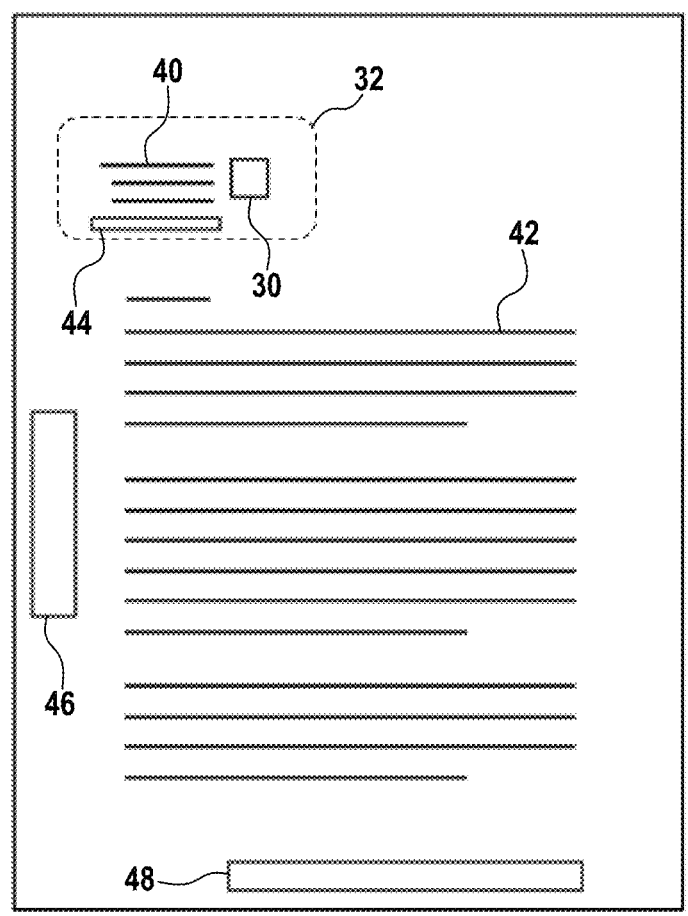
FIG. 3 shows an example of the first page of a document to be processed according to the invention.

FIG. 3 shows an example of the first page of a document to be processed according to the invention.

The first page typically includes a destination address 40 and a text message 42. The destination address is located in an area corresponding to the address window 32. In this example, the address window is located in the top left section of the document, but it may also be located in any other section, top, middle or bottom, right or left sections.

The first page also includes a controlling barcode 30 containing the mailpiece identifier used to identify the first page of the document. The controlling barcode will be searched at a particular position corresponding to the selected job type. According to the manner in which this position has been specified, the search may be performed in the entire address window or in a smaller area. Other barcodes 44, 46, 48 located outside the search area, or not having the proper symbology or content, will be ignored.

According to the invention, the controlling barcode 30 of the first page contains indications of the positions where the following controlling barcodes 34 can be found on subsequent pages, and may also contain finishing instructions and/or a page count as explained above.

Figure 4:
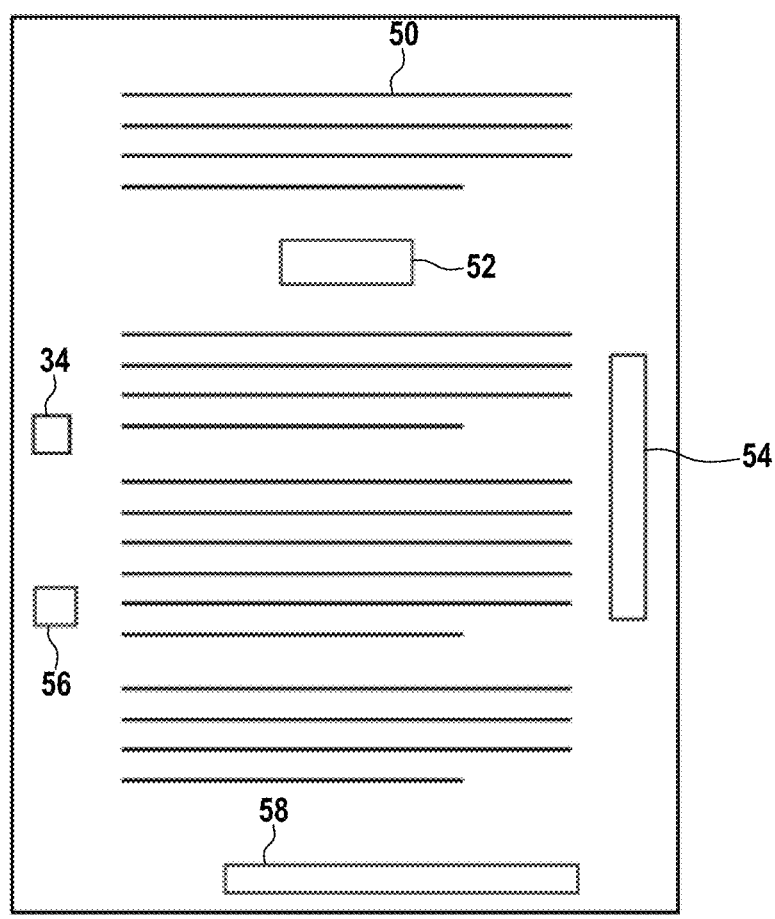
FIG. 4 shows an example of one of the subsequent pages of a document to be processed according to the invention.

FIG. 4 show an example of one of the subsequent pages of a document to be processed according to the invention.

The subsequent page typically includes the rest of the text message 50 and/or other content such as chart or pictures (not represented). The page also includes another controlling barcode 34 containing the finishing instructions necessary to complete the document set. This controlling barcode 34 will be searched at the position indicated on the previous page, which may be the first page, or any other page if controlling barcodes are located at varying positions within the document set. As for the first page, other barcodes 52, 54, 56, 58 located outside the search area, or not having the proper symbology or content, will be ignored.

In a specific embodiment, all possible controlling barcode positions for the first and subsequent pages are recorded in the job parameters of the inserting station 12 during a setting phase. This can be made in an automated manner like in U.S. Pat. No. 8,306,259, or manually. Controlling barcodes 30, 34 will be searched according to the page count 36. For instance, the controlling barcode 30 of the first page will be searched in the address window 32 and the controlling barcode 34 of any of the subsequent pages will be searched in the left or right margin. In that case, the position of the controlling barcode may not need to be printed on the previous page.

In an alternative embodiment, particularly suited for the close loop mode, the controlling barcode positions are not recorded in the job parameters of the inserting station, but rather included in the job file. In this case, the entire surface of the first page of the first document of a batch may be searched for a job ID. The corresponding job file is looked-up in the database of the computer 14 and the controlling barcode positions for the following pages, and all following mailpieces in the batch are retrieved. Although the close loop mode does not require a controlling barcode to be printed on each page, it might be still desirable to scan them for integrity purposes, or when switching back to the open loop mode in case of network failure.

Figure 5:
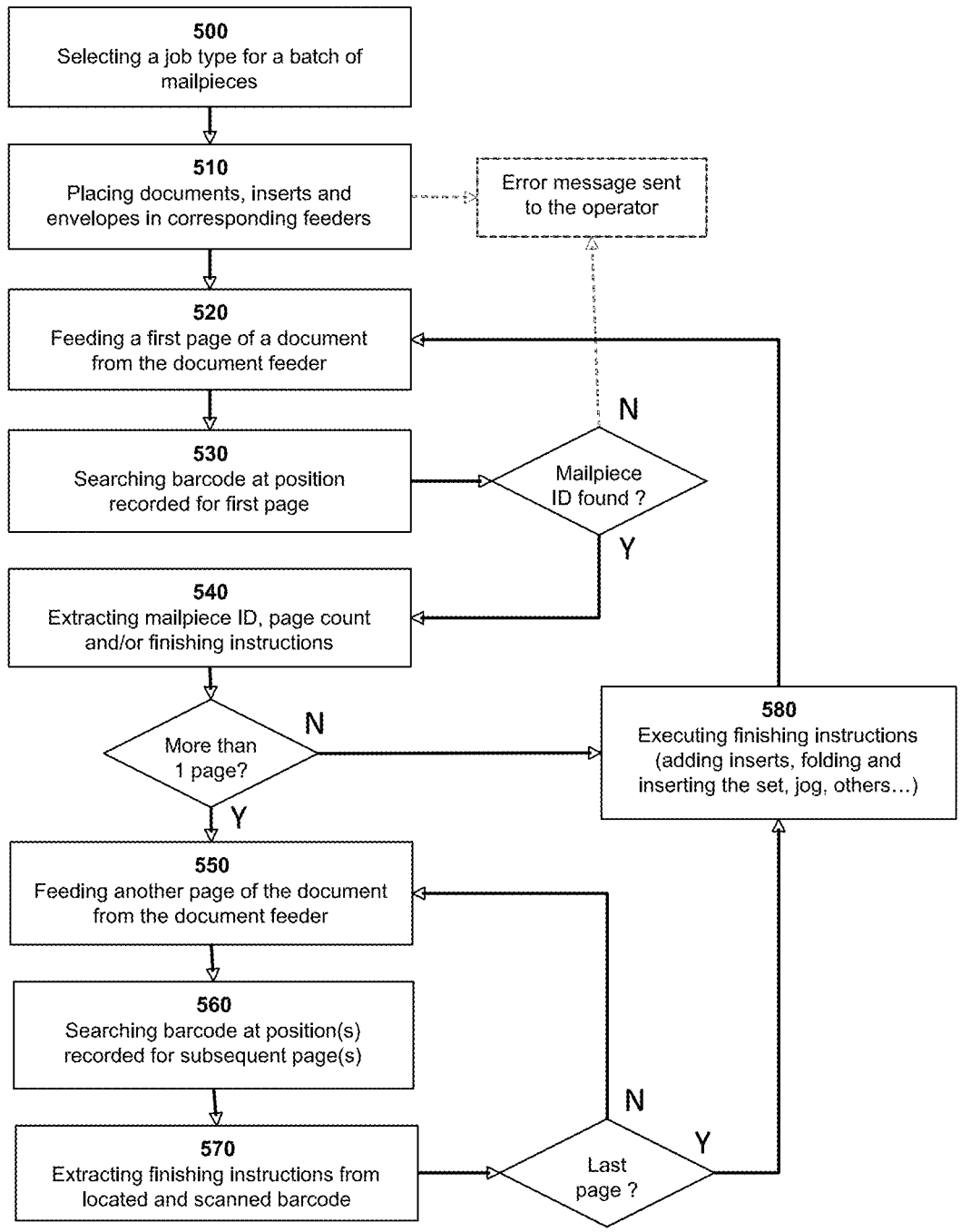
FIG. 5 is a flowchart of a first embodiment of the method of the invention.

FIG. 5 is a flowchart of a first embodiment of the method for practicing the invention.

At step 500, a job type is selected by the operator for a corresponding batch of mailpieces. The job type typically refer to job parameters such as fold type (C, Z or V), additional inserts, an envelope size, and in this case two positions where controlling barcodes can be found on the pages of a document. One position is for the first page of a document set. The second position is for all subsequent pages of the document set.

At step 510, the operator places the documents, the inserts and the envelopes in their corresponding feeders according to the selected job type. An error message may be sent to the operator if some of the job components are missing at this stage.

At step 520, the first page of a document is fed from the document feeder and scanned by the document scanner.

At step 530, the mailpiece identifier barcode is searched at the position recorded for the first page of the document set. If no barcode is found, or if the found barcodes do not contain the expected mailpiece identifier, an error message is sent to the operator.

This may happen if the documents placed in the document feeder do not correspond to the selected job type.

At step 540, the mailpiece identifier, page count and/or finishing instructions are extracted from the controlling barcode searched at step 530. If the document contains only one page, the finishing instructions for to that particular mailpiece may also be included in the controlling barcode. In this case the method goes directly at step 580.

At step 550, assuming that the document contains more than one page, another page is fed from the document feeder and scanned by the document scanner.

At step 560, the controlling barcode is searched at the position recorded for subsequent pages of the documents set and finishing instructions are extracted at step 570. The finishing instructions relate to additional inserts, jogging or diverting the mailpiece, etc. If the current page is not the last one of the document, then the method goes back at step 550 and another page is fed from the document feeder.

In a particular aspect of the invention, there might be more than one controlling barcode position recorded for subsequent pages, for instant a specific position for any second page and another specific position for any third page, etc. This is the case notably when different types of communication are merged in the same document. The controlling barcode will then be searched at a new position on the following page according to the page count.

When all pages of the document have been fed, the finishing instructions are executed at step 580 to form a complete mailpiece, and the method goes back at step 520 where the first page of a another document, belonging to the following mailpiece, is fed. The method then continues towards completion of the job.

Figure 6:
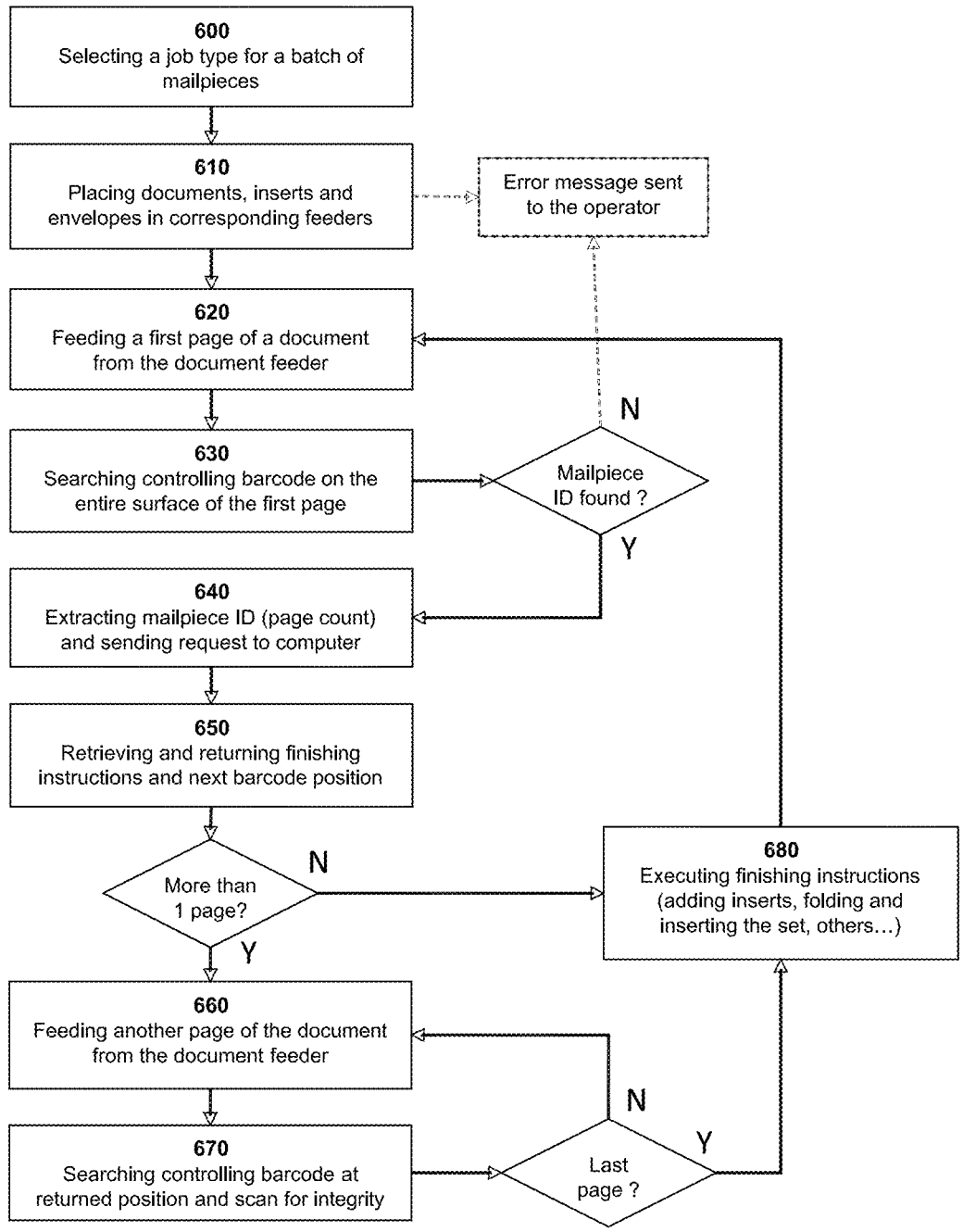
FIG. 6 is a flowchart of a second embodiment of the method of the invention.

FIG. 6 is a flowchart of a second embodiment of the method for practicing the invention.

At step 600, a job type is selected by the operator for a corresponding batch of mailpieces. The job type typically refers to job parameters such as fold type (C, Z or V), additional inserts, an envelope size, and in this case no position where the mailpiece ID barcode can be found on the first page of a document.

At step 610, the operator places the documents, the inserts and the envelopes in their corresponding feeders according to the selected job type. An error message may be sent to the operator if some of the job components are missing at this stage.

At step 620, the first page of a document is fed from the document feeder and scanned by the document scanner.

At step 630, the entire surface of the first page is searched for a barcode containing a mailpiece identifier. If no barcode is found, or if the barcode doesn't contain the expected mailpiece identifier, an error message is sent to the operator. Again, this may happen if the documents placed in the document feeder do not correspond to the selected job type.

At step 640, the job/mailpiece identifier, and optionally the page count, are extracted from the controlling barcode searched at step 630, and a request containing the job/mailpiece ID is sent to the general purpose computer running the production software. Alternatively, the page count may not be included in the controlling barcode but rather returned by the general purpose computer for integrity purposes.

At step 650, the general purpose computer looks-up the corresponding job file and the corresponding mailpiece in the job file, retrieves the finishing instructions and the controlling barcode positions for the following pages, then sends a response containing the finishing instructions for the mailpiece, optionally the page count, and the position of the barcode printed on the next page. If the document contains only one page, the method goes directly at step 680.

At step 660, assuming that the document contains more than one page, another page is fed from the document feeder and scanned by the document scanner.

At step 670, a controlling barcode is searched at the position corresponding to the page count and retrieved by the general purpose computer at step 660, and scanned for integrity purposes. If the current page is not the last one of the document, then the method goes back at step 660 and another page is fed from the document feeder.

When all pages of the document have been fed, the finishing instructions are executed at step 680 to form a complete mailpiece, and the method goes back at step 620 where the first page of another document, belonging to the following mailpiece, is fed. The method then continues towards completion of the job.

This method offers a greater flexibility in programming as all information about the position of controlling barcodes are contained in the job file and thus do not need to be printed on each page. These positions may vary from one page to another. As the following pages are fed from the document feeder, the controlling barcodes are searched according to the page count at the different positions returned by the general computer. For instance a first position may be associated to page 2 to j, and then a second position be associated to page j+1 to k, a third position associated to pages k+1 to l, and so on.

Figure 7:
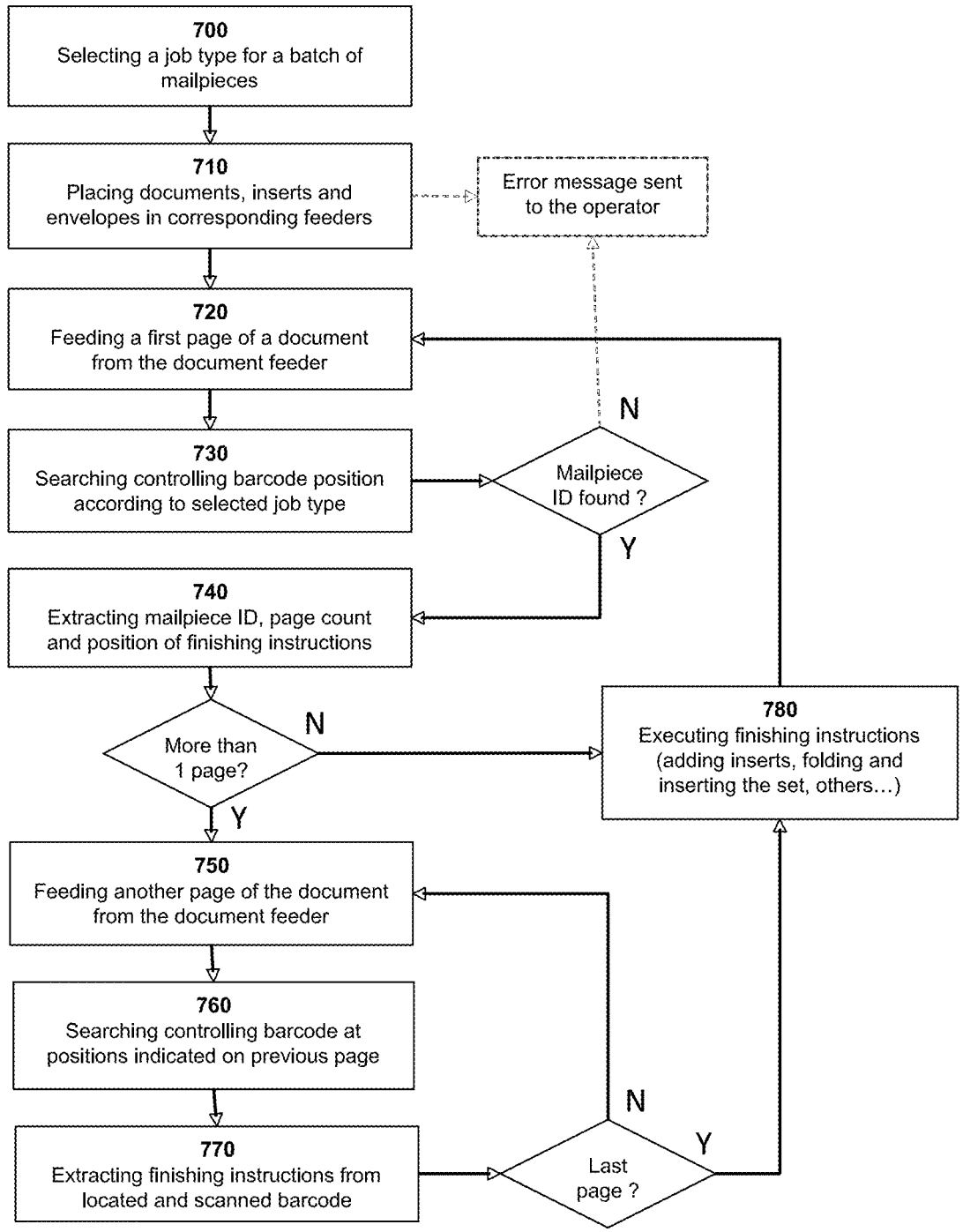
FIG. 7 is a flowchart of a third embodiment of the method of the invention.

FIG. 7 is a flowchart of a third embodiment of the method for practicing the invention.

At step 700, a job type is selected by the operator for a corresponding batch of mailpieces. The job type typically refers to job parameters such as fold type (C, Z or V), additional inserts, an envelope size, and in this case the position where the mailpiece identifier barcode can be found on the first page of a document.

At step 710, the operator places the documents, the inserts and the envelopes in their corresponding feeders according to the selected job type. An error message may be sent to the operator if some of the job components are missing at this stage.

At step 720, the first page of a document is fed from the document feeder and scanned by the document scanner.

At step 730, the mailpiece identifier barcode is searched at a position recorded for the selected job type. If no barcode is found, or if the barcode doesn't contain the expected mailpiece identifier, an error message is sent to the operator. Again, this may happen if the documents placed in the document feeder do not correspond to the selected job type.

At step 740, the mailpiece identifier, page count and/or position of subsequent finishing instructions are extracted from the controlling barcode searched at step 730. If the document contains only one page, the finishing instructions for to that particular mailpiece are included in the controlling barcode as well. In this case the method goes directly at step 780.

At step 750, assuming that the document contains more than one page, another page is fed from the document feeder and scanned by the document scanner.

At step 760, the controlling barcode is searched at the position extracted at step 740 and finishing instructions are extracted at step 770. The finishing instructions relate to additional inserts, jogging or diverting the mailpiece, etc. If the current page is not the last one of the document, then the method goes back at step 750 and another page is fed from the document feeder.

In a particular aspect of the invention, the controlling barcode searched at step 760 may also contain a barcode position on the following page, different from the one indicated on the preceding page. This is the case notably when different types of communication are merged in the same document. The controlling barcode will then be searched at this new position on the following page. Otherwise, if the same or no further barcode position is found, then the controlling barcode will be searched at the same position. In practice indeed, this position may be indicated only on the first page of the document.

When all pages of the document have been fed, the finishing instructions are executed at step 780 to form a complete mailpiece, and the method goes back at step 720 where the first page of another document, belonging to the following mailpiece, is fed. The method then continues towards completion of the job.

Examples of barcode content for practicing the method will now be explained.

In a specific embodiment, corresponding to the method of FIG. 5, two controlling barcode positions are recorded in the job parameters of the inserting station 12. One position is for the first page of a document set. The second position is for all subsequent pages of the document set.

Example of Barcode Content:
jjjjjjjjjjmmmmmmmmmmNNMM
"j"=job ID
"m"=mailpiece ID
"NN"=page within the mailpiece
"MM"=total pages within the mailpiece
Typical:
A00000045600000000010103
A00000045600000000010203
A00000045600000000010303
A00000045600000000020102
A00000045600000000020202

When "NN" is equal to "01" and "MM" is greater than "01" then the barcode being read is representing the first page of a multiple page document set. In this case, the inserting station expects the next page to be a subsequent page of the document set. In expectation, the inserting station makes itself ready to search the next page for a barcode at the recorded position for subsequent pages. It will directly scan this subsequent page recorded position, without having to scan any other area. Any other barcodes on the page will be ignored.

When "NN" is greater than "01" and not equal to "MM" then the barcode being read is representing a subsequent page, but not the last one, of a multiple page document set. In this case, the inserting station expects the next page to be another subsequent page within the document set, like the one it has just read. In expectation, the inserting station remains ready to search the next page for a barcode at the recorded position for subsequent pages. It will directly scan this subsequent page recorded position, without having to scan any other area. Any other barcodes on the page will be ignored.

When "NN" is equal to "MM" then the barcode being read is representing either the only page is a single page document set, or the last page of a multiple page document set. In either case, the inserting station expects the next page to be the first page of a new document set. In expectation, the inserting station makes itself ready to search the next page for a barcode at the recorded position for the first page. It will directly scan this first page recorded position, without having to scan any other area. Any other barcodes on the page will be ignored.

In an alternative embodiment, corresponding to the method of FIG. 6, the controlling barcode positions are not recorded in the job parameters of the inserting station, but rather included in the job file. When the first page of a batch of mailpieces is fed into the inserting station, its entire surface will be searched for a barcode containing a mailpiece identifier. All subsequent barcode positions are provided by the production software.

Example Barcode:
jjjjjjjjjjmmmmmmmmmmNNMM
"j"=job ID
"m"=mailpiece ID
Typical:
A0000004560000000001
A0000004560000000001
A0000004560000000001
A0000004560000000002
A0000004560000000002

When a barcode is read, the job ID and mailpiece ID are sent to the general purpose computer running the production software. The general purpose computer looks-up the corresponding job file and the corresponding mailpiece in the job file, then sends a response containing the finishing instructions for the mailpiece, the page count, and including the position of the barcode on the next page. This method is particularly intended for the close loop production mode.

In another embodiment, corresponding to the method of FIG. 7, only the controlling barcode position of the first page is recorded in the job parameters of the inserting station. When the first page of a batch of mailpieces is fed into the inserting station, a barcode containing the mailpiece identifier will be searched at that first position. The coordinates of subsequent barcode positions are exact and provided by the barcode on the previous page.

Example of Barcode Content:

jjjjjjjjjjmmmmmmmmmmNNMMXXXYYYRpppppp

"j"=job ID
"m"=mailpiece ID
"NN"=page within the mailpiece
"MM"=total pages within the mailpiece
"XXX"=x coordinate in millimetres of centre of the next page's barcode
"YYY"=y coordinate in millimetres of centre of the next page's barcode
"R"=orientation (Vertical or Horizontal or Two-dimensional)
"p"=finishing instructions (e.g. insert from feeder, jog, divert)

Typical:
A0000004560000000000101030051 05V031011
A0000004560000000000102030051 05V031011
A0000004560000000000103030950 65H031111
A0000004560000000000201020051 05V021001
A0000004560000000000202020950 65H021001

The x and y coordinates correspond to the Cartesian coordinates of a page a shown on FIGS. 3 and 4.

When a barcode is read, it is parsed to find the coordinates for the position of the barcode on the next page. If these coordinates are different from the current coordinates, then the inserting station makes itself ready to scan only in this new position. Otherwise, it will continue to scan in the current position. Any other barcodes on the page will be ignored.

Finishing instructions may typically include a current/total number of pages of the document set, whether to add an insert from a feeder, or to jog the conveyor when the mailpiece exits the inserting station, or even whether to divert the mailpiece into a different sized envelope according to the total number of pages.

Though exemplary embodiments of the invention have been described, many variations are possible. For instance, any of the steps illustrated on FIGS. 5 to 6 may include a search on the entire surface of the first page of mailpiece for a mailpiece identifier, or adversely a search at a position recorded with the job parameters of the selected job type.

In the exemplary embodiments, the job type is selected by the operator. However this selection may be automated to some extent. The method may start by the extraction and/or scanning of a cover page in search of a barcode containing the job type, or even a job ID as the job parameters corresponding to a batch of mailpieces may also be included in the job file. Then the inserting station will auto setup itself and display to the operator which kinds of inserts or envelopes shall be placed in the feeders.

A search of the entire surface of the first page may be performed only when this first page belongs to the first mailpiece of the batch. When the position of the controlling barcode has been found on this first page, then it may be recorded and reused for all first pages of the documents belonging to the following mailpieces. Alternatively, the position of the controlling barcode of the first page of the following document may be either included in the response returned by the general computer, or in the controlling barcode printed on the last page of the preceding document.

The markings corresponding to the mailpiece identifier or the finishing instructions may not always be printed to the form or barcodes, but rather some of them be printed in clear text and interpreted by Optical Character Recognition (OCR).

The invention claimed is:

1. A method for processing a batch of mailpieces on an inserting station comprising at least a document feeder and a document scanner to read barcodes printed on pages of documents belonging to said batch of mailpieces, the method including:
    selecting a job type having job parameters for the batch of mailpieces,
    extracting a first page belonging to a mailpiece from the document feeder,
    scanning the first page with the document scanner,
    searching for a first barcode printed on the first page, wherein searching for a first barcode is made at a first defined position on the first page, the first defined position being recorded in job parameters of the job type selected for the batch of mailpieces,
    reading the first barcode on the first page,
    extracting from the first barcode an information including at least one of a mailpiece identifier, a page count or position coordinates,
    processing the information to retrieve a position of a second barcode printed on a second page to be extracted from the document feeder,
    extracting the second page from the document feeder,
    scanning the second page with the document scanner,
    searching for a second barcode on the second page at the retrieved position, and
    reading the second barcode on the second page.

2. The method of claim 1, wherein the first page and the second page belong to a same mailpiece.

3. The method of claim 1, wherein the first page is the only page and/or the last page of a mailpiece, and the second page to be extracted from the document feeder is the first page of a following mailpiece.

4. The method of claim 2, wherein searching for a first barcode is made at a first defined position on the first page, and searching for a second barcode is made at a second defined position on the second page, the first defined position and the second defined position being recorded in the job parameters of the job type selected for the batch of mailpieces, the information extracted from the first barcode includes the page count; and searching for the first and second barcodes is performed according to the page count.

5. The method of claim 4, wherein the first and second barcodes include the following sequence of characters:
    jjjjjjjjjjmmmmmmmmmmNNMM
    where:
    "j"=job ID
    "m"=mailpiece ID
    "NN"=page within the mailpiece
    "MM"=total pages within the mailpiece.

6. A method for processing a batch of mailpieces on an inserting station comprising at least a document feeder and a document scanner to read barcodes printed on pages of documents belonging to said batch of mailpieces, the method including:
    selecting a job type having job parameters for the batch of mailpieces,
    extracting a first page belonging to a mailpiece from the document feeder, scanning the first page with the document scanner,
searching for a first barcode printed on the first page,
reading the first barcode on the first page,
extracting from the first barcode an information including at least one of a mailpiece identifier, a page count or position coordinates,
processing the information to retrieve a position of a second barcode printed on a second page to be extracted from the document feeder,
extracting the second page from the document feeder,
scanning the second page with the document scanner,
searching for a second barcode on the second page at the retrieved position, and
reading the second barcode on the second page,
wherein processing the information extracted from the first barcode further includes sending, from the inserting station, a request to a general purpose computer, and returning from the general purpose computer the position coordinates of barcodes printed on subsequent pages.

7. The method of claim 6, wherein the first barcode includes the following sequence of characters:
jjjjjjjjjjmmmmmmmmmm
where:
"j"=job ID
"m"=mailpiece ID.

8. The method of claim 6, wherein the request contains a job ID included in the mailpiece identifier, and the job ID is used by the general purpose computer to identify a job file corresponding to the batch of mailpieces.

9. The method of claim 2, wherein the position coordinates of the second barcode are extracted from the first barcode.

10. The method of claim 2 wherein the position of the second barcode is the same on all subsequent pages of a mailpiece, and the information is only extracted from a first barcode printed on the first page of the mailpiece.

11. The method of claim 2, wherein the position of subsequent barcodes varies from one page to another of the same mailpiece, and the searching of the second barcode is performed according to the page count and/or the position coordinates.

12. The method of claim 1, wherein at least one of the barcodes further includes finishing instructions for processing the mailpiece by the inserting station.

13. The method of claim 1, wherein the first and second barcodes include the following sequence of characters:
jjjjjjjjjjmmmmmmmmmmNNMMXXXYYYRpppppp
where:
"j" is a job ID
"m" is a mailpiece ID
"NN" is a page within the mailpiece
"MM" is the total pages of the mailpiece
"XXX" is the x coordinate in millimeters of center of the next page's barcode
"YYY" is the y coordinate in millimeters of center of the next page's barcode
"R" is the orientation (Vertical or Horizontal or Two-dimensional) of the barcode
"p" are finishing instructions.

* * * * *